United States Patent
Nakai et al.

(10) Patent No.: US 7,487,547 B2
(45) Date of Patent: Feb. 3, 2009

(54) CONTENT PROCESSING APPARATUS AND CONTENT PROTECTION PROGRAM

(75) Inventors: Shinichi Nakai, Kanagawa (JP); Naohiko Noguchi, Kanagawa (JP); Shinichi Matsui, Hyogo (JP); Taihei Yagawa, Nara (JP); Shunji Harada, Osaka (JP); Ryuji Inoue, Osaka (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 279 days.

(21) Appl. No.: 10/491,963

(22) PCT Filed: Oct. 11, 2002

(86) PCT No.: PCT/JP02/10589

§ 371 (c)(1),
(2), (4) Date: Apr. 8, 2004

(87) PCT Pub. No.: WO03/034651

PCT Pub. Date: Apr. 24, 2003

(65) Prior Publication Data

US 2004/0260923 A1 Dec. 23, 2004

(30) Foreign Application Priority Data

Oct. 12, 2001 (JP) .............................. 2001-316023

(51) Int. Cl.
*H04L 9/00* (2006.01)
(52) U.S. Cl. .............................. 726/26; 726/28; 726/29; 726/30; 726/31; 726/32; 380/247
(58) Field of Classification Search ................. 380/247; 726/26, 1
See application file for complete search history.

(56) References Cited

U.S. PATENT DOCUMENTS

| 5,392,356 | A | * | 2/1995 | Konno et al. ................ 380/249 |
| 6,170,060 | B1 | | 1/2001 | Mott et al. |
| 6,427,073 | B1 | * | 7/2002 | Kortesalmi et al. ...... 455/414.1 |
| 6,556,680 | B1 | * | 4/2003 | Leonardi .................... 380/247 |

(Continued)

FOREIGN PATENT DOCUMENTS

EP 1 037 460 9/2000

(Continued)

*Primary Examiner*—Syed A. Zia
*Assistant Examiner*—Saoussen Besrour
(74) *Attorney, Agent, or Firm*—Browdy and Neimark, P.L.L.C.

(57) ABSTRACT

A contents processing device permitting, when contents are to be stored in a recording medium, only a specified device to read out the stored contents is to be provided, and a contents processing device capable, where it is a mobile telephone, of flexibly adapting to a change of a unique telephone number or a type of the mobile telephone. For the purpose, the contents processing device for inputting and outputting contents to and from a recording medium is provided with contents storage means (RAM) for storing contents, an ID storage unit (ROM) for storing an ID capable of identifying the contents processing device, a recording medium input/output unit (memory card I/F) for inputting to and outputting from the recording medium, and a ciphering unit (ciphering program) for enciphering contents within the contents storage unit by use of a ciphering key generated from the ID within the ID storage unit and storing it from the recording medium input/output unit into the recording medium.

11 Claims, 16 Drawing Sheets

U.S. PATENT DOCUMENTS

| | | | |
|---|---|---|---|
| 6,993,135 B2 * | 1/2006 | Ishibashi | 380/277 |
| 2001/0032088 A1 * | 10/2001 | Utsumi et al. | 705/1 |
| 2002/0076051 A1 * | 6/2002 | Nii | 380/232 |
| 2003/0061488 A1 * | 3/2003 | Huebler et al. | 713/176 |

FOREIGN PATENT DOCUMENTS

| | | |
|---|---|---|
| JP | 06-208760 | 7/1994 |
| JP | 2000-195161 | 7/2000 |
| JP | 2000-349726 | 12/2000 |

* cited by examiner

CONTENT PROCESSING APPARATUS AND CONTENT PROTECTION PROGRAM

BACKGROUND OF THE INVENTION

1. Field of the Invention

The present invention relates to a device for processing of inputs and outputs of digital contents to and from a recording medium and a contents protection program.

2. Description of the Prior Art

Along with the progress of digital technology in recent years, it has become possible for various digital devices including personal computers and mobile telephones to handle a wide variety of contents such as documents, still pictures, moving pictures and music as digital contents. Since such digital contents are sent every day to electronic devices in large quantities, it is impossible to save all the incoming digital contents in the memory unit of a digital device. For this reason, many digital devices are able to store digital contents on a readable/writable and detachable recording medium.

However, as the specifications of the storage formula of any recording medium are standardized and made open, anybody can readily make a copy of the contents of a given recording medium by use of a personal computer. This makes it impossible to protect the copyright of the producer of the digital contents, and therefore it is called upon to develop a technique for protecting the contents of recording media from the standpoint of copyright protection.

Known formulas for preventing illegal copying of contents include one by which contents are enciphered with an enciphering key utilizing a medium ID for uniquely identifying a recording medium within the recording medium and recording the enciphered contents on the recording medium and, at the time of reading the contents out, a formula requiring the medium ID used at the time of enciphering is used. In this way, even if contents are illegitimately copied onto another recording medium, the contents cannot be correctly read out because there is no right medium ID, and illegal copying of contents can be thereby prevented.

This formula, however, allows playback of the recording medium on which legitimately written contents are stored with any one of a plurality of compatible devices, and accordingly involves the problem that the recording medium can be illegitimately transferred or resold to another person or the contents can be used by a plurality of persons.

SUMMARY OF THE INVENTION

A first object of the present invention, attempted in view of the problem noted above, is to provide a contents processing device permitting, when contents are to be stored in a recording medium, only a specified device to read out the stored contents.

A second object of the invention is to provide a contents processing device permitting only a specified device to read out the stored contents by use of the ID of the specified device as the ciphering key.

A third object of the invention is to provide a contents processing device capable of flexibly adapting to a change of the ID or the type of the specified device permitted to read out the contents.

A fourth object of the invention is to provide a contents processing device using, where the invention is applied to a mobile telephone, the unique telephone number of the mobile telephone as the ciphering key and thereby permitting only that specific mobile telephone to read out contents.

A fifth object of the invention is to provide a contents processing device capable, where the invention is applied to a mobile telephone, of flexibly adapting to a change of the unique telephone number or the type of the mobile telephone.

In order to achieve the objects stated above, a contents processing device capable of inputting and outputting contents to and from a recording medium according to the invention is provided with a contents storage area unit (corresponding to a RAM 206 in FIG. 2) for storing contents, an ID storage area unit (corresponding to a ROM 208 in FIG. 2) for storing an ID capable of identifying the contents processing device, a recording medium input/output unit (corresponding to a memory card I/F 205 in FIG. 2) for inputting to and outputting from the recording medium, and a ciphering unit (corresponding to a ciphering program 211 in FIG. 2) for enciphering contents within the contents storage area unit by use of a ciphering key generated from the ID within the ID storage area unit and storing it from the recording medium input/output unit into the recording medium.

By virtue of this configuration, the invention provides the benefit that, by storing the content into the recording medium after enciphering the content by use of the ciphering key generated from the ID intrinsic to the device when a content is to be stored into the recording medium, it is made possible for the content to be read out only by the device used for storing.

According to the invention, where it is applied to a mobile telephone, the telephone number intrinsic to the mobile telephone is used as the ID, this telephone number is used as the ciphering key. This makes it possible to permit reading of the contents only by a specific mobile telephone. Where the device ID is to be changed on such an occasion as the telephone number change of a mobile telephone, by providing a formula of enciphering/deciphering with the previous device ID, it is made possible for the contents to be read out even after the device ID has been changed.

Furthermore, when the device ID is to be transferred to another terminal as is the case with a type change of a mobile telephone, by providing a formula for safe transfer of the device ID, another terminal can be enabled to read out the stored contents.

The above-stated objects and advantages of the invention will become more apparent from the preferred embodiments thereof described below when taken in conjunction with the accompanying drawings.

DESCRIPTION OF THE PREFERRED EMBODIMENTS

Embodiment 1

Figure 1:
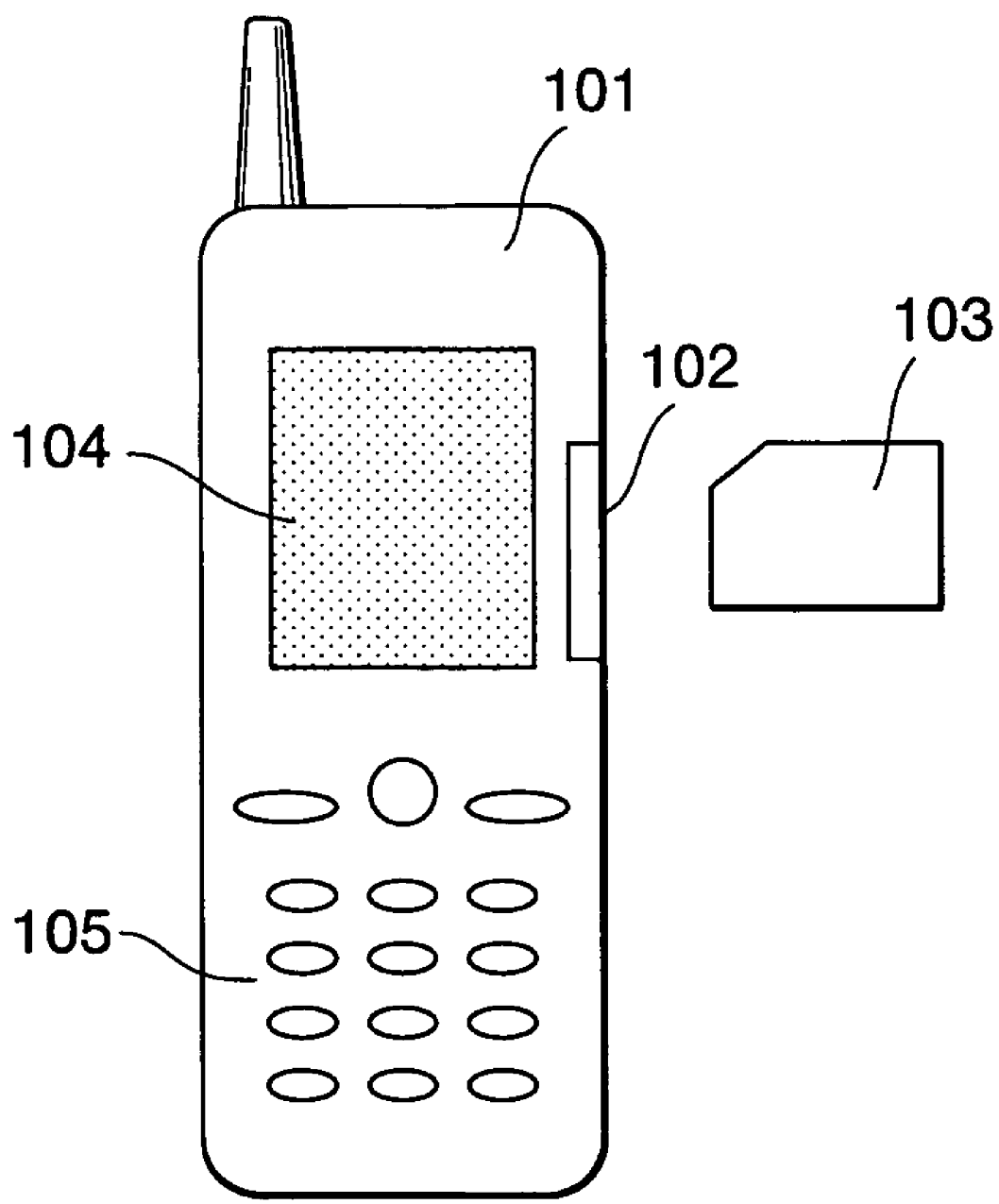
FIG. 1 shows an overview of a contents processing device according to the present invention, which is a mobile telephone in this example.

A first preferred embodiment of the invention will be described below with reference to drawings. FIG. 1 shows a frontal overview of a contents processing device according to the invention, which is a mobile telephone in this example.

A mobile telephone 101 shown in FIG. 1 has a memory card I/F 102 permitting attaching and detaching (insertion and extraction of a memory card 103 as an external memory, and can read and write into and out of the memory card 103 inserted into that memory card I/F 102. This configuration enables the user to operate keys 105 according to a GUI displayed on a liquid crystal screen 104 and to exchange contents, such as a call melody and wallpaper between the mobile telephone 101 and the memory card 103.

Figure 2:
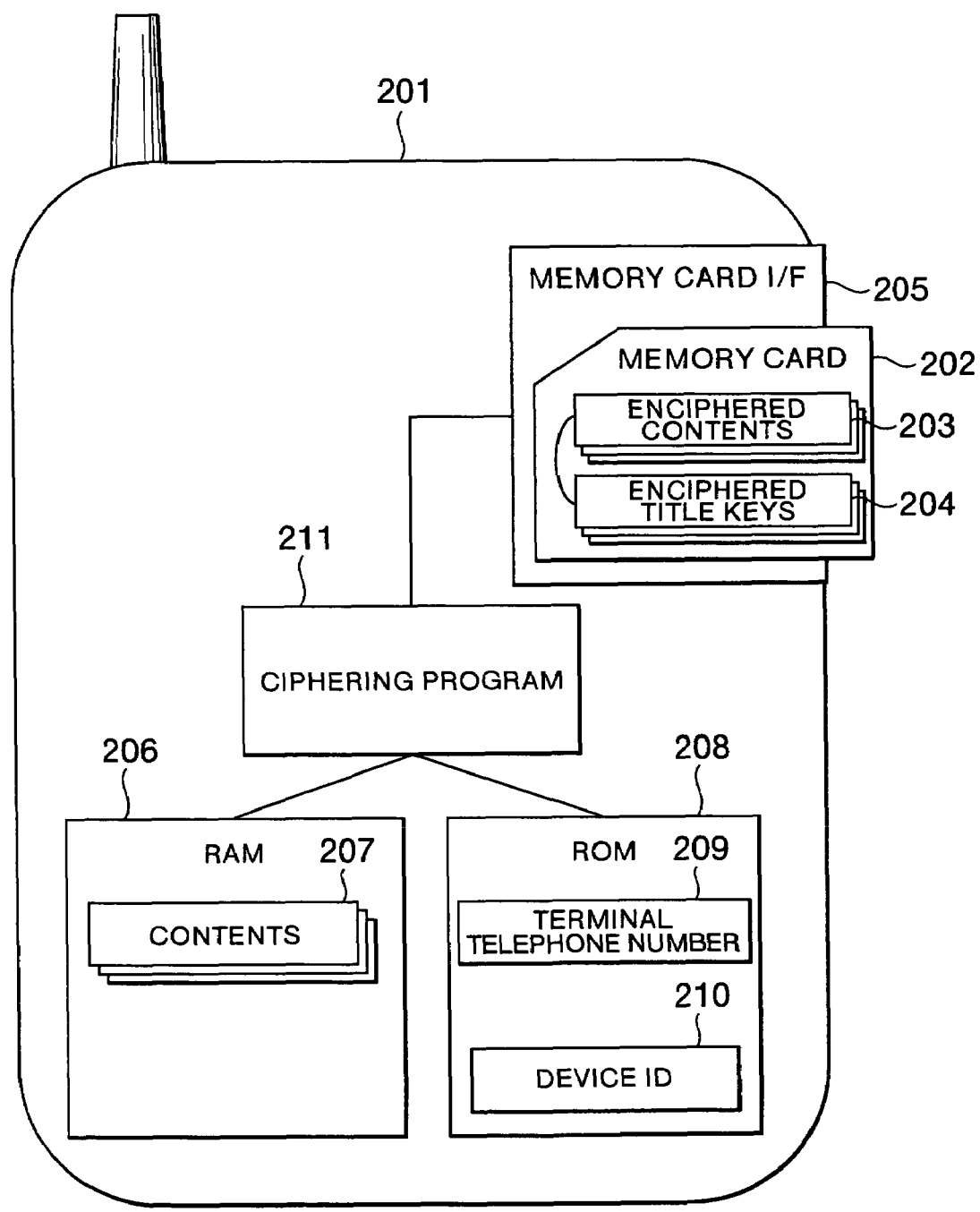
FIG. 2 is a block diagram of the internal configuration of a mobile telephone, which is a first preferred embodiment of the invention.

FIG. 2 is a block diagram of the internal configuration of the mobile telephone 101 embodying the invention in this mode. In FIG. 2, reference numeral 201 denotes a mobile telephone; 202, a memory card; 203, enciphered contents stored within the memory card 202; 204, enciphered title keys derived from enciphering of the title keys in enciphering the contents 203; 205, a memory card I/F serving as the interface inputting and outputting between the memory card 202 and the mobile telephone 201; 206, a random access memory (RAM); 207, contents stored in the RAM 206; 208, a read only memory (ROM); 209, the terminal telephone number of the mobile telephone 201 stored within the ROM 208; 210, a device ID permitting unique identification of the mobile telephone 201; and 211, a ciphering program for deciphering the enciphered contents 203 within the memory card 202 and enciphering the contents 207 within the RAM 206 and storing the enciphered contents into the memory card 202. Incidentally, the enciphered contents 203 and the enciphered title keys 204 are matched to each other on a one-to-one basis in the memory card 202 so that the right enciphered title key 204 for deciphering a given enciphered content 203 can be identified.

Figure 3:
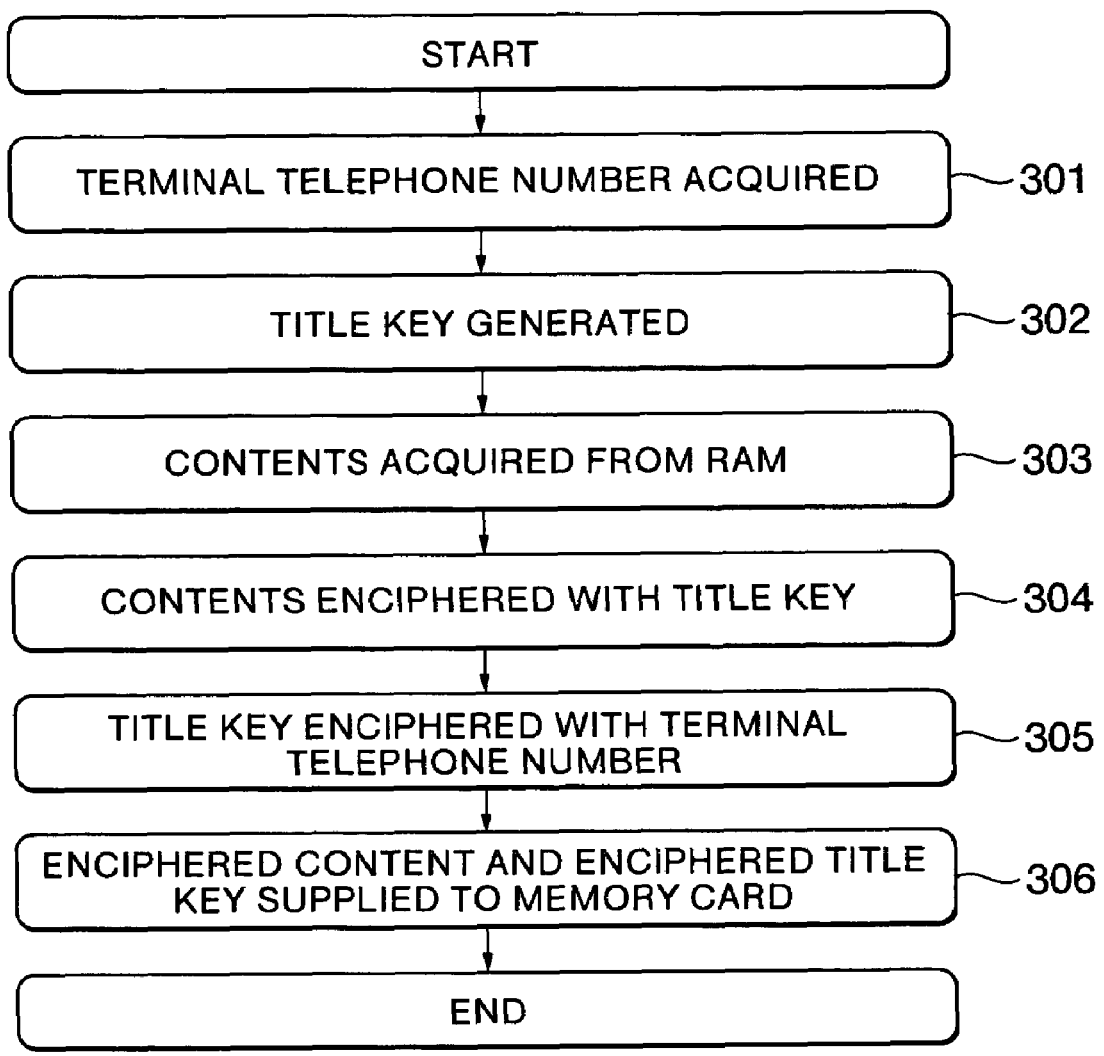
FIG. 3 is a flowchart showing one example of algorithm used when contents are enciphered and the enciphered contents are stored into a memory card in the first preferred embodiment of the invention.

FIG. 3 is a flowchart showing one example of algorithm used when the ciphering program 211 enciphers a content 207 in the RAM 206 and stores the resultant enciphered content into the memory card 202.

In this algorithm, the ciphering program 211 acquires the terminal telephone number 209 from the ROM 208 (Step 301), and generates a title key (Step 302). Then, it acquires a content 207 from the RAM 206 (Step 303), enciphers the content acquired at Step 303 with the title key generated at Step 302 (Step 304), and enciphers the title key generated at Step 302 with a ciphering key generated from the terminal telephone number acquired at Step 301 (Step 305). Then, it stores into the memory card 202 the enciphered content enciphered at Step 304 and the enciphered title key enciphered at Step 305 (Step 306). Incidentally, a "title key" is a key used when enciphering/deciphering a content, and a "ciphering key", a key used when enciphering/deciphering a title key.

Figure 4:
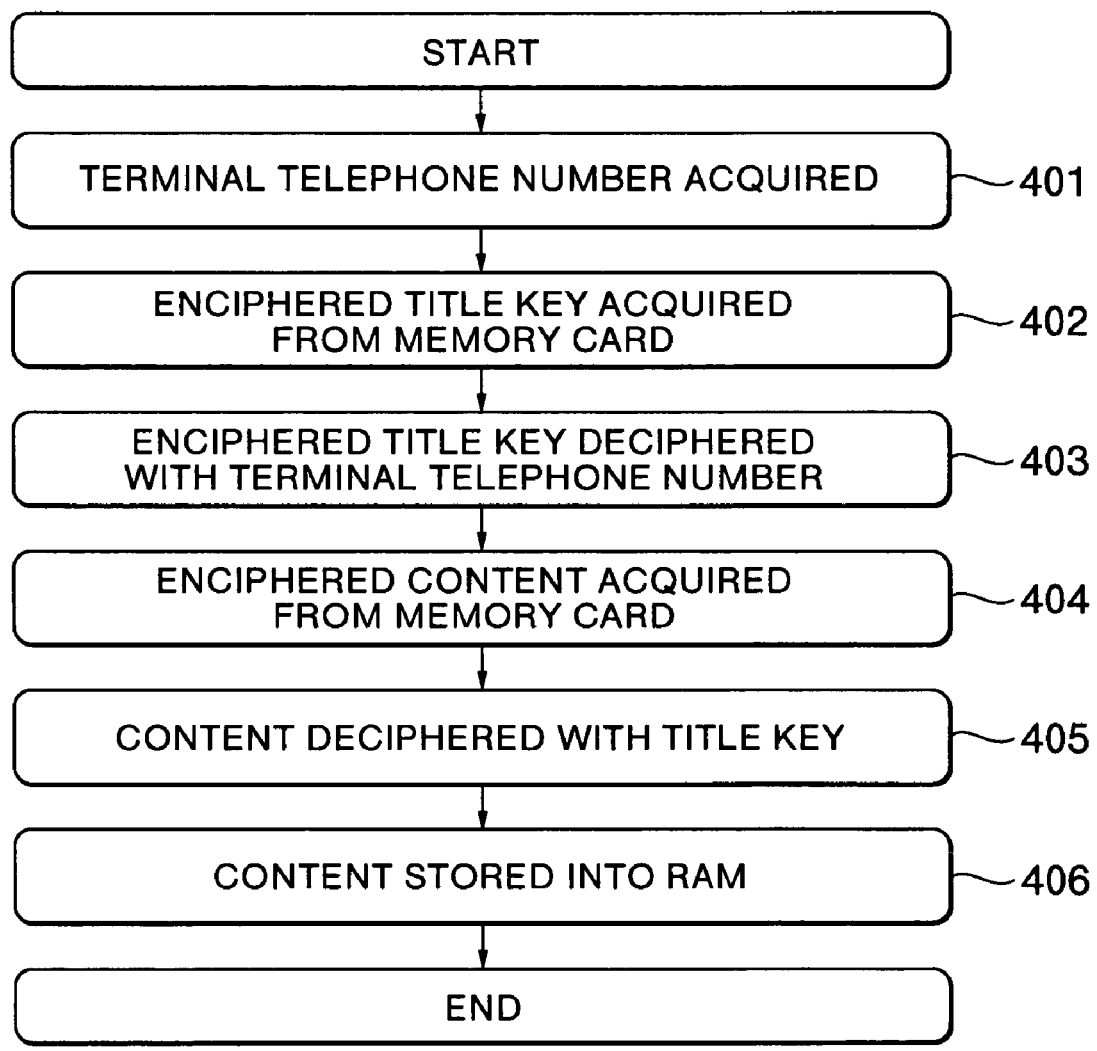
FIG. 4 is a flowchart showing one example of algorithm used when enciphered contents are deciphered and the deciphered contents are stored into a RAM in the first preferred embodiment of the invention.

FIG. 4 is a flowchart showing one example of algorithm used when the ciphering program 211 deciphers an enciphered content within the memory card 202 and stores the resultant deciphered content into the RAM 206.

In this algorithm, the ciphering program 211 acquires the terminal telephone number 209 from the ROM 208 (Step 401), acquires an enciphered title key from the memory card 202 (Step 402), deciphers the enciphered title key acquired at Step 402 with a ciphering key generated from the terminal telephone number acquired at Step 401 (Step 403), acquires an enciphered content from the memory card 202 (Step 404), and deciphers the enciphered content acquired at Step 404 with the title key acquired at Step 403 (Step 405). Then it stores the content deciphered at Step 405 into the RAM 206 (Step 406).

Incidentally, the algorithm which the ciphering program 211 uses when storing any enciphered content 203 within the memory card 202 into the RAM 206 may be any other algorithm than what was described above if only it can decipher contents enciphered by the algorithm used by the ciphering program 211 when it stores the contents 207 within the RAM 206 into the memory card 202 as enciphered contents.

Even if it is attempted, by use of the algorithm described above, to decipher and read any enciphered content 203 in the memory card 202 with a mobile telephone different from the mobile telephone used in storing it into the memory card 202, deciphering is impossible because of a difference in the terminal telephone number 209, which is required when deciphering any enciphered content 203, so that it is made possible to read contents stored in the memory card 202 only with a specific terminal.

Figure 5:
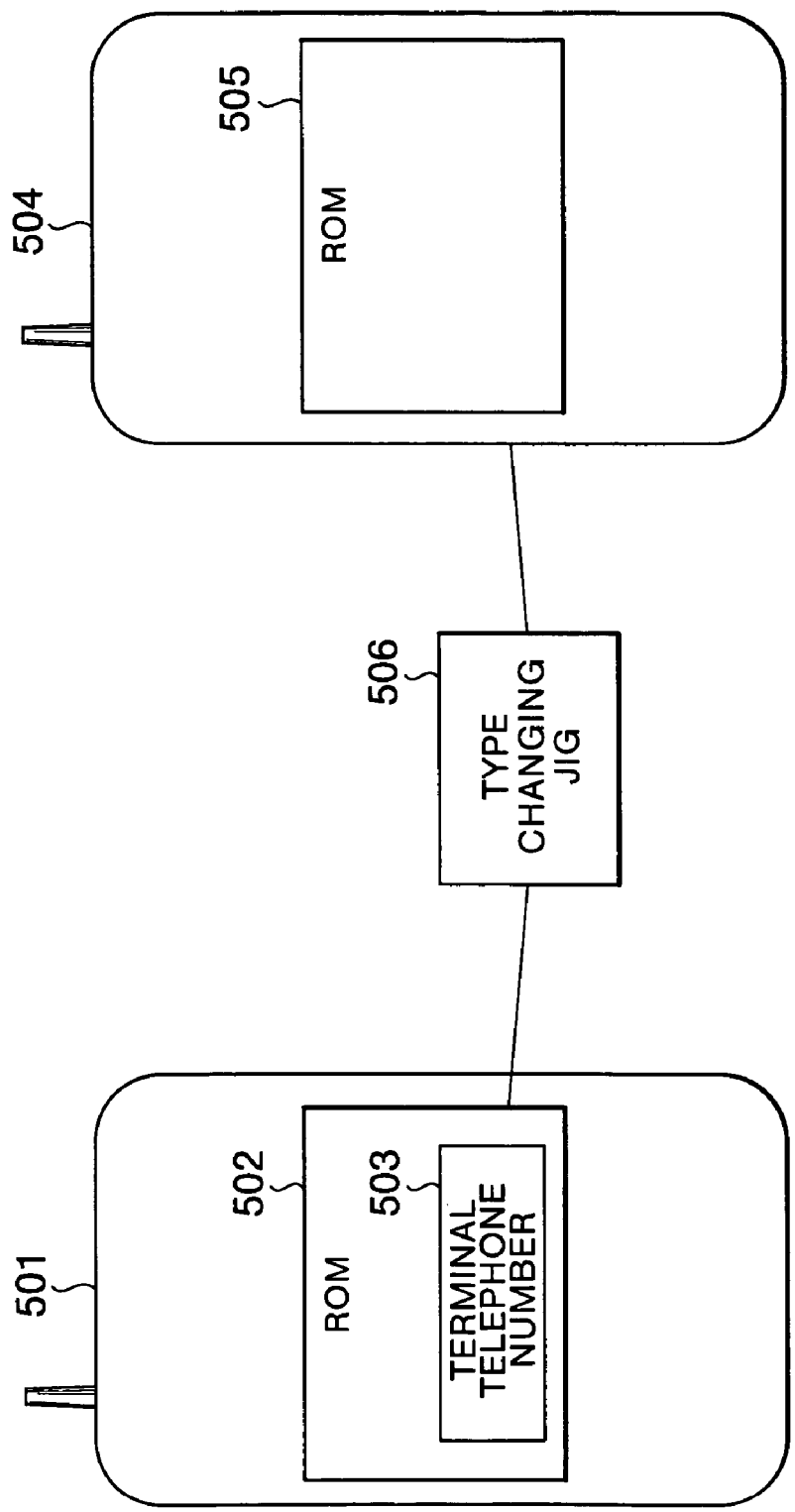
FIG. 5 shows an overview of a type changing system in the first preferred embodiment of the invention.

Next will described an example in which the type of the mobile telephone is changed in this first mode for implementing the invention. FIG. 5 shows an overview of a system for changing the type of the mobile telephone. Reference numeral 501 denotes the mobile telephone used until now; 502, a ROM within the mobile telephone 501; 503, the terminal telephone number of the mobile telephone 501; 504, the mobile telephone to be newly used; 505, a ROM within the mobile telephone 504; and 506, a type changing jig for acquiring the telephone number 503 of the mobile telephone 501 from the ROM 502 and transferring it to the ROM 505 within the mobile telephone 504.

By use of the type changing jig 506 shown in FIG. 5, the terminal telephone number in the mobile telephone so far used can be transferred to the new mobile telephone, and therefore it is made possible to decipher in the new mobile telephone contents within the memory card by use of the algorithm shown in FIG. 4.

Incidentally, while enciphering of contents is accomplished by the ciphering program in this embodiment of the invention, a circuit performing similar processing to the ciphering program can as well be used.

Further in this embodiment a ciphering key generated from, the terminal telephone number 209 is used in enciphering a title key, but a title key may as well be enciphered by use of a ciphering key generated from the device ID 210. The type changing jig 506 in that case enables any content within the memory card to be deciphered by the algorithm shown in FIG. 4 even in the new mobile telephone by transferring the device ID of the mobile telephone so far used to the mobile telephone to be newly used. Further by use of the device ID 210, this technique can be applied not only to mobile telephones but also devices in general into which a memory card can be inserted, including PDAs, personal computers and portable audio equipment.

Where the terminal telephone number and the device ID are stored in a storage unit detachable from the mobile telephone, such as an SIM card or a UIM card, a user having an SIM card or a UIM card can decipher the contents of the memory card at any of a plurality of terminals.

Incidentally, where the memory card has a specific memory area having a mechanism for authentication with devices and accessible only by a device having successfully passed the authentication, by storing the enciphered title keys in the specific memory area, a personal computer or the like unable to pass authentication with the memory card can be prevented from acquiring the enciphered title keys, and the level of copyright protection can be further enhanced.

Embodiment 2

Figure 6:
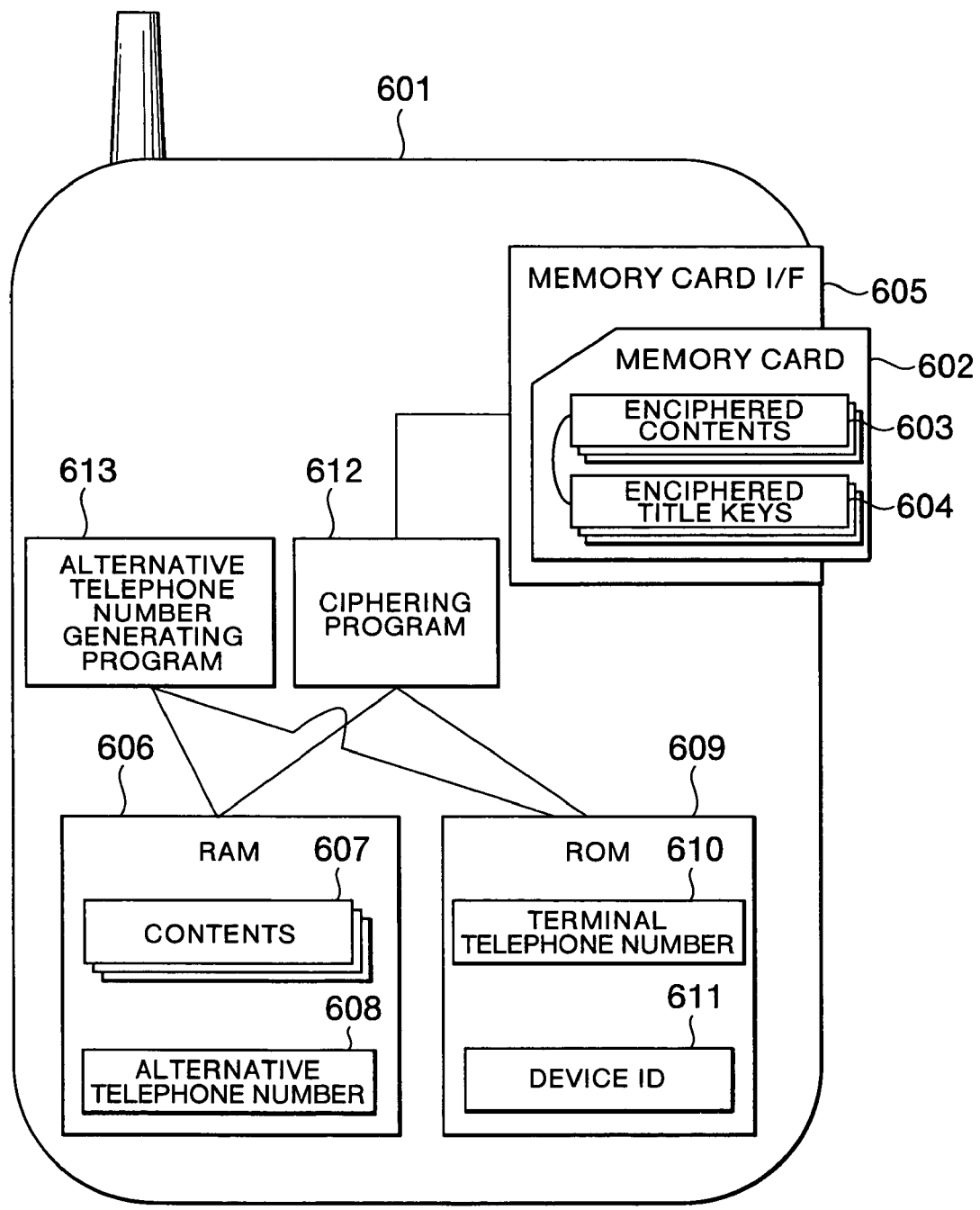
FIG. 6 is a block diagram of the internal configuration of a mobile telephone, which is a second preferred embodiment of the invention.

A second preferred embodiment of the present invention will be described below with reference to drawings. FIG. 6 is a block diagram of the internal configuration of the mobile telephone 101 in this mode for implementing the invention. In FIG. 6, reference numeral 601 denotes a mobile telephones; 602, a memory card; 603, enciphered contents stored within the memory card; 604, enciphered title keys derived from enciphering of the title keys in enciphering the contents 603; 605, a memory card I/F serving as the interface inputting and outputting between the memory card 602 and the mobile telephone 601; 606, a RAM; 607, contents stored in the RAM 606; 608, an alternative telephone number stored in the RAM; 609, a ROM; 610, the terminal telephone number of the mobile telephone 601 stored within the ROM; 611, a device ID capable of uniquely identifying the mobile telephone 601; 612, a ciphering program for deciphering the enciphered contents 603 within the memory card 602 and enciphering the contents 607 within the RAM 606 and storing the enciphered contents into the memory card 602; and 613, an alternative telephone number generating program for generating the alternative telephone number 608 and storing it into the RAM 606. Incidentally, the enciphered contents 603 and the enciphered title keys 604 are matched to each other on a one-to-one basis in the memory card 602 so that the right enciphered title key 604 for deciphering a given enciphered content 603 can be identified.

Figure 7:
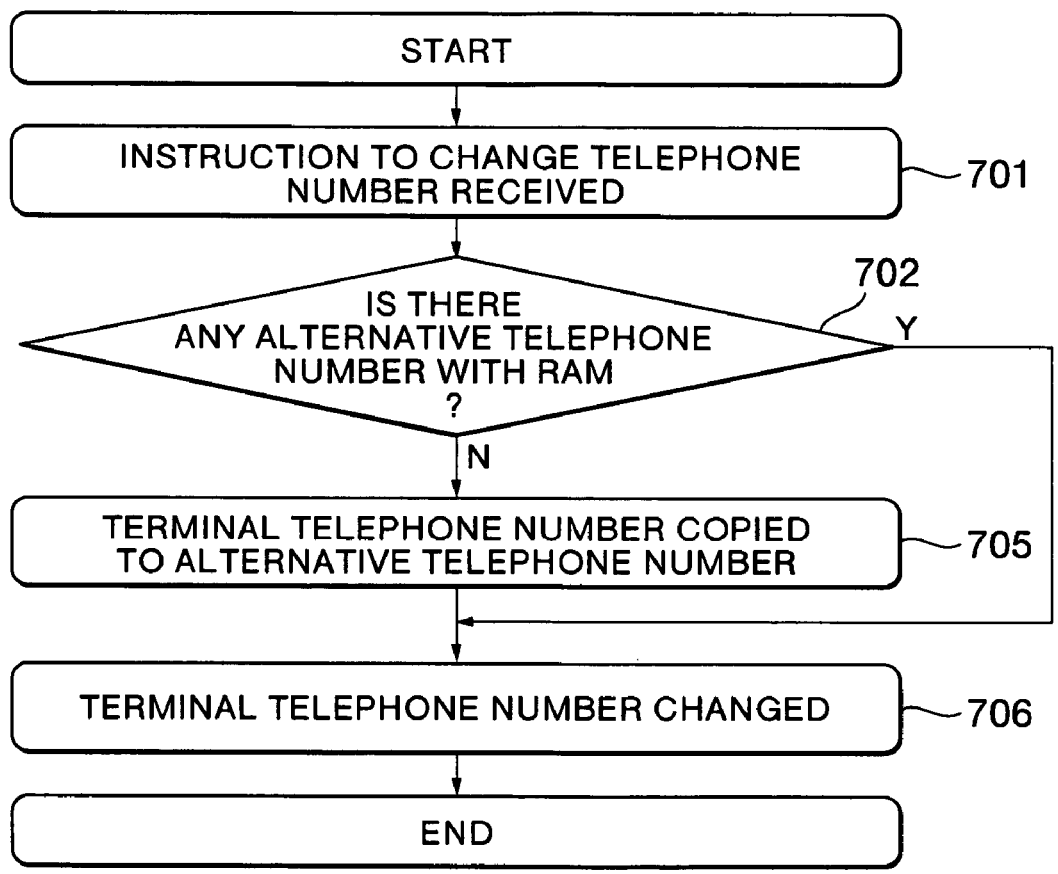
FIG. 7 is a flowchart showing one example of algorithm of telephone number changing in the second preferred embodiment of the invention.

FIG. 7 is a flowchart showing one example of algorithm used when the alternative telephone number generating program 613 changes the telephone number at the same terminal, of generating the alternative telephone number 608 and storing it into the RAM 606.

In this algorithm, the alternative telephone number generating program 613, if it receives an instruction to change the telephone number by a key input or otherwise (Step 701), checks whether or not there is any alternative telephone number 608 within the RAM 606 (Step 702) and, if it finds no alternative telephone number at Step 702, copies the terminal telephone number 610 into the RAM 606 (Step 703) to replace the terminal telephone number 610 with a new terminal telephone number (Step 704). If an old ciphering key is found at Step 702, it replaces the terminal telephone number 610 with a new terminal telephone number (Step 704).

Figure 8:
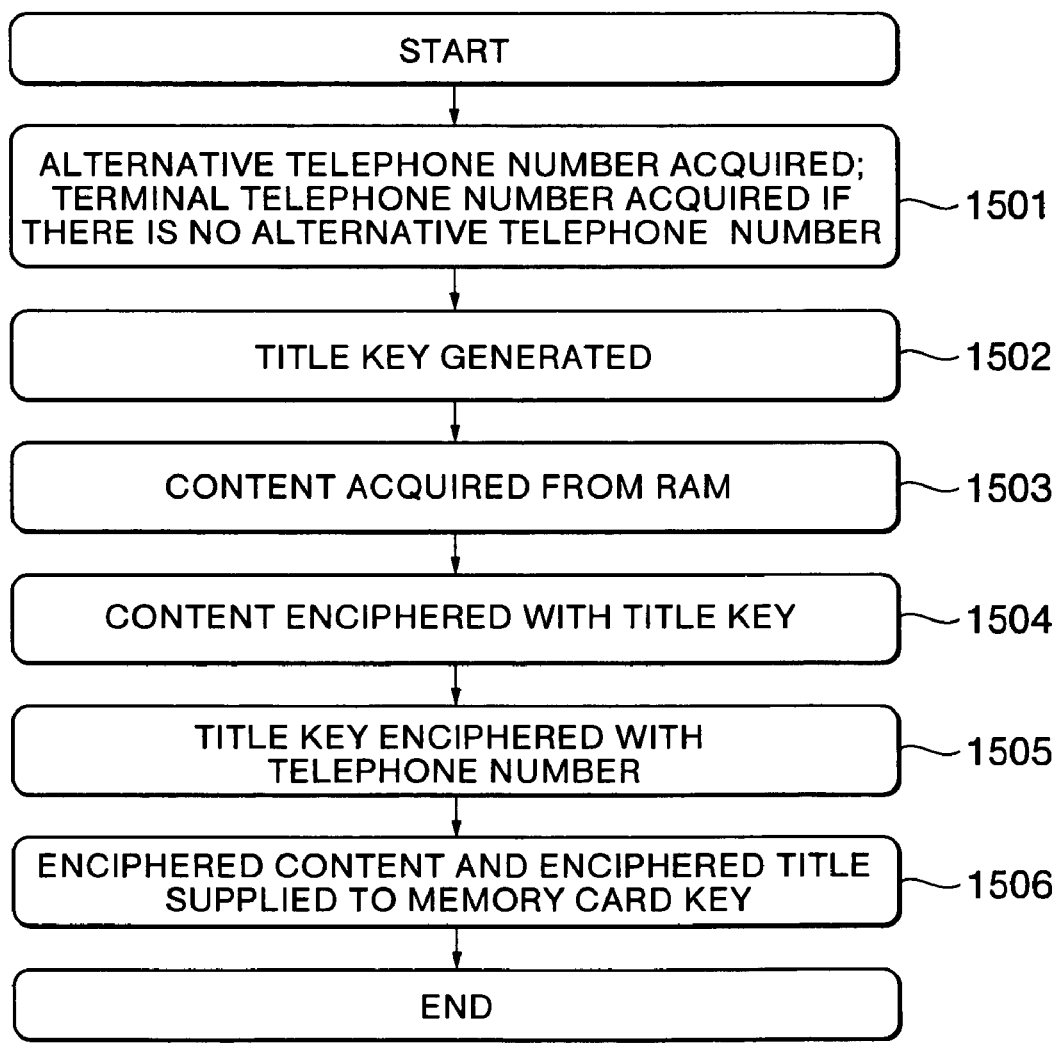
FIG. 8 is a flowchart showing one example of algorithm used when contents are enciphered and the enciphered contents are stored into a memory card in the second preferred embodiment of the invention.

FIG. 8 is a flowchart showing one example of algorithm used when the ciphering program 612 enciphers a content 607 in the RAM 606 and stores the resultant enciphered content into the memory card 602.

In this algorithm, the ciphering program 612, if there is any alternative telephone number 608 in the RAM 606, acquires the alternative telephone number 608 or, if there is no alternative telephone number 608, acquires the terminal telephone number 610 from the ROM 609 (Step 1501), generates a title key (Step 1502), acquires a content 607 from the RAM 606 (Step 1503), enciphers the content acquired at Step 1503 with the title key acquired at Step 1502 (Step 1504), enciphers the title key generated at Step 1502 with the ciphering key generated from the alternative telephone number or the terminal telephone number acquired at Step 1501 (Step 1505), and stores into the memory card 602 the content enciphered at Step 1504 and the title key enciphered at Step 1505 (Step 1506).

Figure 9:
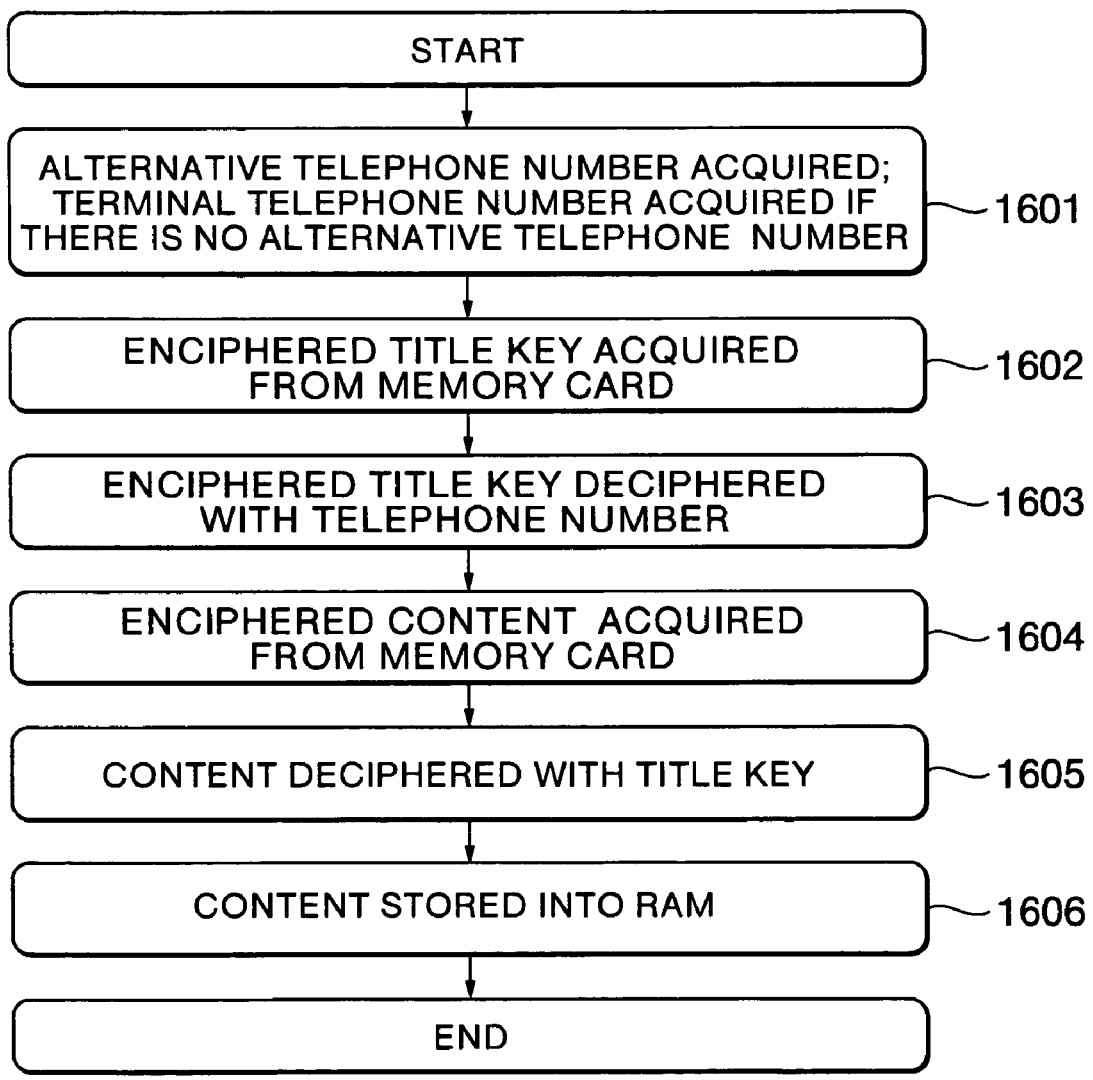
FIG. 9 is a flowchart showing one example of algorithm used when enciphered contents are deciphered and the deciphered contents are stored into a RAM in the second preferred embodiment of the invention.

FIG. 9 is a flowchart showing one example of algorithm used when the ciphering program 612 deciphers an enciphered content 603 within the memory card 602 and stores the resultant deciphered content into the RAM 606.

In this algorithm, the ciphering program 612, if there is any alternative telephone number 608 in the RAM 606, acquires the alternative telephone number 608 or, if there is no alternative telephone number 608, acquires the terminal telephone number 610 from the ROM 609 (Step 1601), acquires an enciphered title key from the memory card 602 (Step 1602), deciphers the enciphered title key acquired at Step 1602 with a ciphering key generated from the alternative telephone number acquired at Step 1601 or the terminal telephone number (Step 1603), acquires an enciphered content from the memory card 602 (Step 1604), deciphers the enciphered content acquired at Step 1604 with a title key deciphered at Step 1603 (Step 1605), and stores the content deciphered at Step 1605 into the RAM 606 (Step 1606).

Incidentally, the algorithm which the ciphering program 612 uses when storing any enciphered content 603 within the memory card 602 into the RAM 606 may be any other algorithm than what was described above if only it can decipher contents enciphered by the algorithm used by the ciphering program 612 when it stores the contents 607 within the RAM 606 into the memory card 602 as enciphered contents.

In this embodiment of the invention, the type of the mobile telephone can be changed in the same was as in Embodiment 1. Where the terminal telephone number of the mobile telephone 601 is changed by the algorithm described above, contents in the memory card stored before changing the terminal telephone number can be read out by enciphering and deciphering the use of the alternative telephone number.

Incidentally, while enciphering of contents is accomplished by the ciphering program in this embodiment of the invention, a circuit performing similar processing to the ciphering program can as well be used.

Where the terminal telephone number and the device ID are stored in a storage unit detachable from the mobile telephone such as an SIM card or a UIM card, a user having an SIM card or a UIM card can decipher the contents of the memory card at any of a plurality of terminals.

Incidentally, where the memory card has a specific memory area having a mechanism for authentication with devices and accessible only by a device having successfully passed the authentication, by storing the enciphered title keys in the specific memory area, a personal computer or the like unable to pass authentication with the memory card can be prevented from acquiring the enciphered title keys, and the level of copyright protection can be further enhanced.

Embodiment 3

A third preferred embodiment of the present invention will be described below with reference to drawings.

The internal configuration of the mobile telephone in this embodiment is similar to what is illustrated in FIG. 2.

Figure 10:
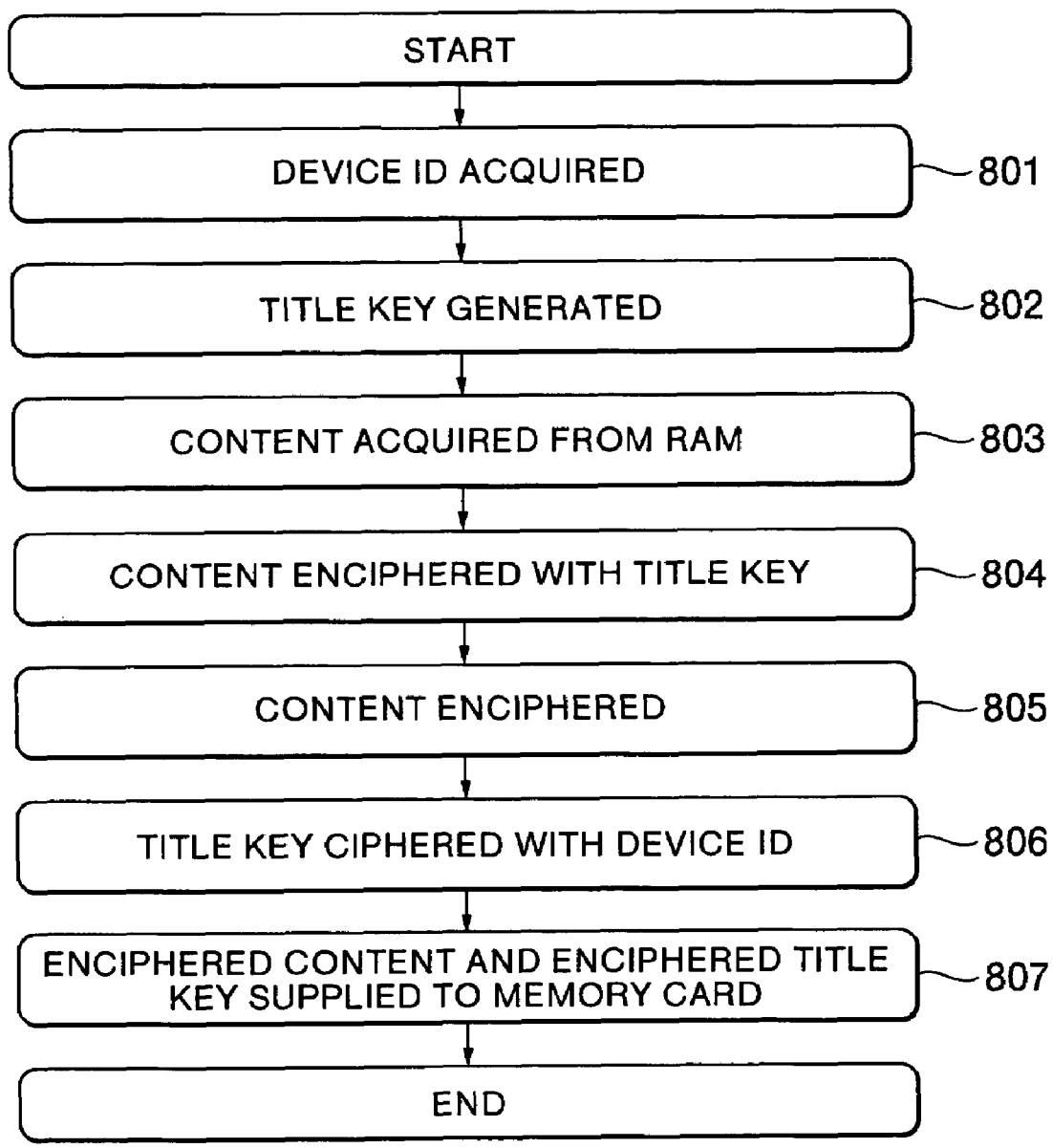
FIG. 10 is a flowchart showing one example of algorithm used when contents are enciphered and the enciphered contents are stored into a memory card in a third preferred embodiment of the invention.

FIG. 10 is a flowchart showing one example of algorithm used in this embodiment when the ciphering program 211 enciphers a content 207 in the RAM 206 and stores the enciphered contents into the memory card 202. The ciphering program 211 acquires the device ID 210 from the ROM 208 (Step 801), generates a title key (Step 802), acquires a content 207 from the RAM 206 (Step 803), enciphers the content acquired at Step 803 with the title key generated at Step 802 (Step 804), enciphers the title key generated at Step 802 with a ciphering key generated from the device ID acquired at Step 801 (Step 805), and stores into the memory card 202 the content enciphered at Step 804 and the title key enciphered at Step 805 (Step 806).

Figure 11:
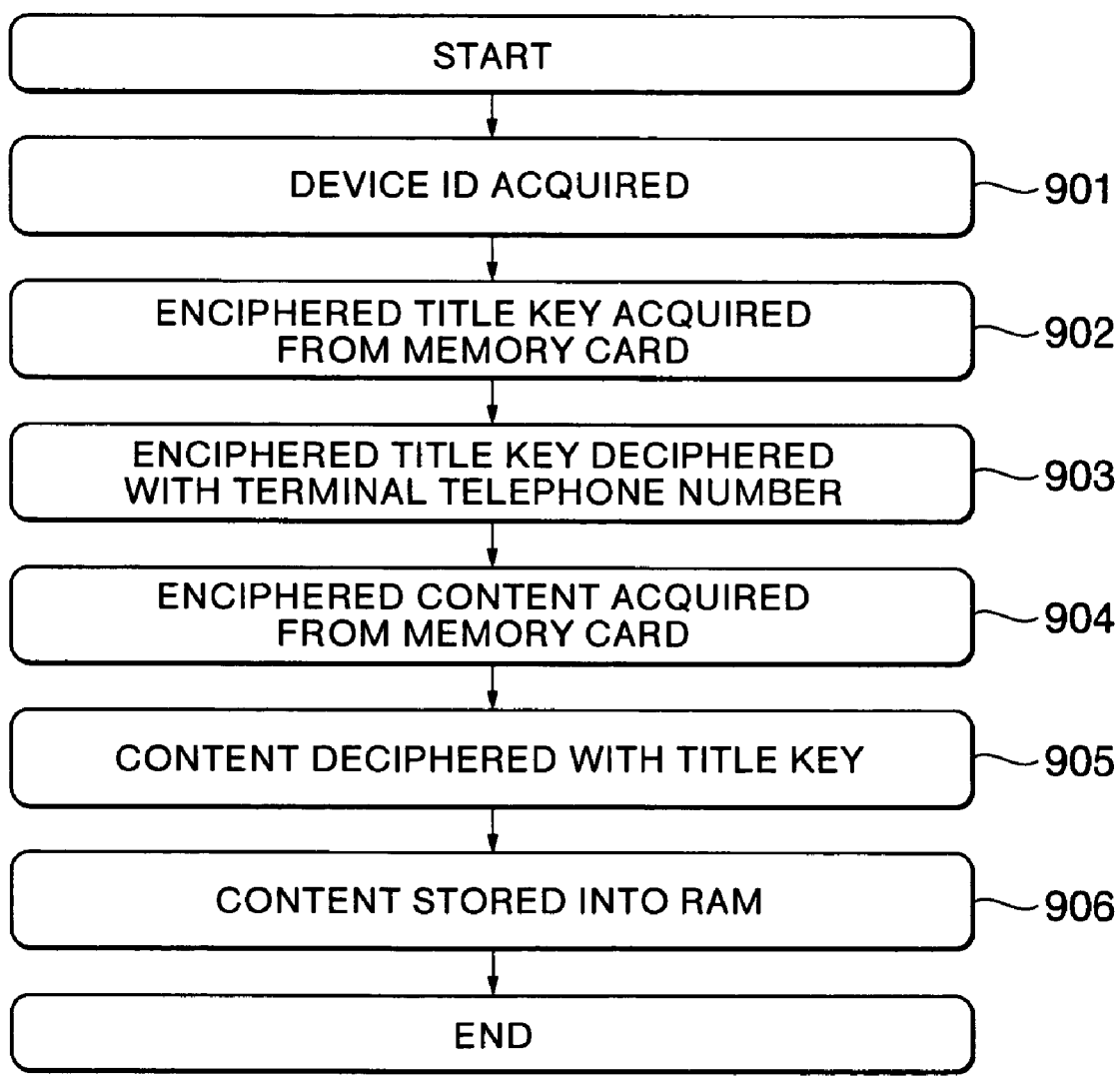
FIG. 11 is a flowchart showing one example of algorithm used when enciphered contents are deciphered and the deciphered contents are stored into a RAM in the third preferred embodiment of the invention.

FIG. 11 is a flowchart showing one example of algorithm used in this embodiment when the ciphering program 211 deciphers an enciphered content 203 within the memory card 202 and stores the result deciphered content into the RAM 206.

In this algorithm, the ciphering program 211 acquires the device ID 210 from the ROM 208 (Step 901), acquires a enciphered title key from the memory card 202 (Step 902), deciphers the enciphered title key acquired at Step 902 by use of a ciphering key generated from the device ID acquired at Step 901 (Step 903), acquires an enciphered content from the memory card 202 (Step 904), deciphers the enciphered content acquired at Step 904 by use of the title key deciphered at Step 903 (Step 905), and stores into the RAM 206 the content deciphered at Step 905 (Step 906).

Incidentally, the algorithm which the ciphering program 211 uses when storing any enciphered content 203 within the memory card 202 into the RAM 206 may be any other algorithm than what was described above if only it can decipher contents enciphered by the algorithm used by the ciphering program 211, described with reference to FIG. 10, when it stores the contents 207 within the RAM 206 into the memory card 202 as enciphered contents.

Even if it is attempted, by use of the algorithm described above, to decipher and read any enciphered content 203 in the memory card 202 with a mobile telephone different from the mobile telephone used in storing it into the memory card 202, deciphering is impossible because of a difference in the device ID 210, which is required when deciphering any enciphered content 203, so that it is made possible to read contents stored in the memory card 202 only with a specific terminal.

Figure 12:
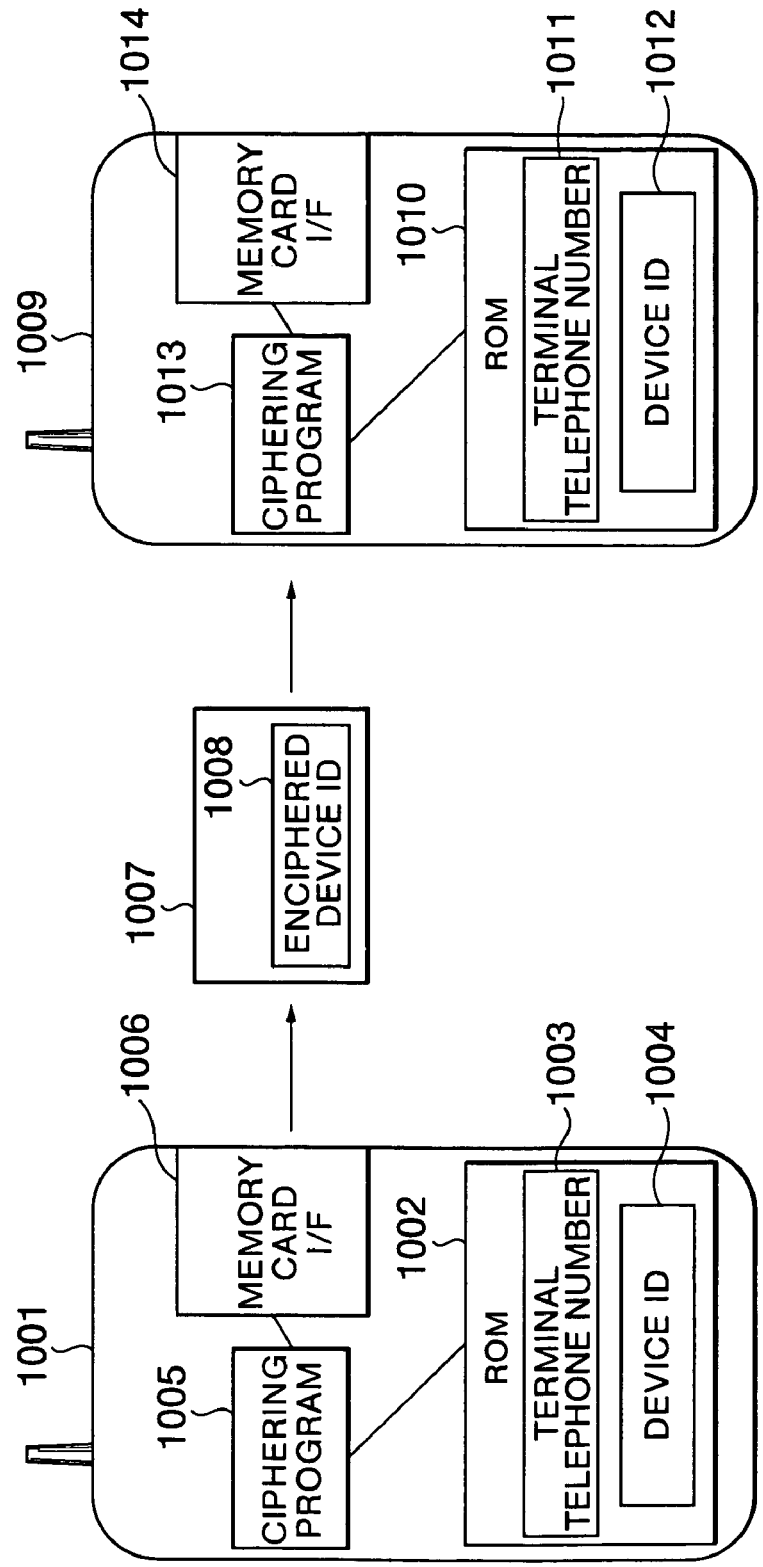
FIG. 12 shows an overview of a type changing system in the third preferred embodiment of the invention.

Next will described an example in which the type of the mobile telephone is changed in this first mode for implementing the invention. FIG. 12 shows an overview of a system for changing the type of the mobile telephone. In FIG. 12, reference numeral 1001 denotes the terminal used until now; 1002, a ROM within the terminal 1001; 1003, a telephone number of the terminal 1001; 1004, an enciphering program for enciphering the telephone number 1003; 1005, a memory card I/F of the terminal 1001; 1006, a memory card for storing the telephone number of the terminal 1001; 1007, a telephone number stored in the memory card 1006; 1008, a terminal to be newly used; 1009, a ROM within the terminal 1008; 1010, a telephone number of the terminal 1008; 1011, a deciphering program for deciphering the telephone number 1007 within the memory card 1006 and storing the deciphered telephone number into the ROM 1009; and 1012, a memory card I/F of the terminal 1008.

Figure 13:
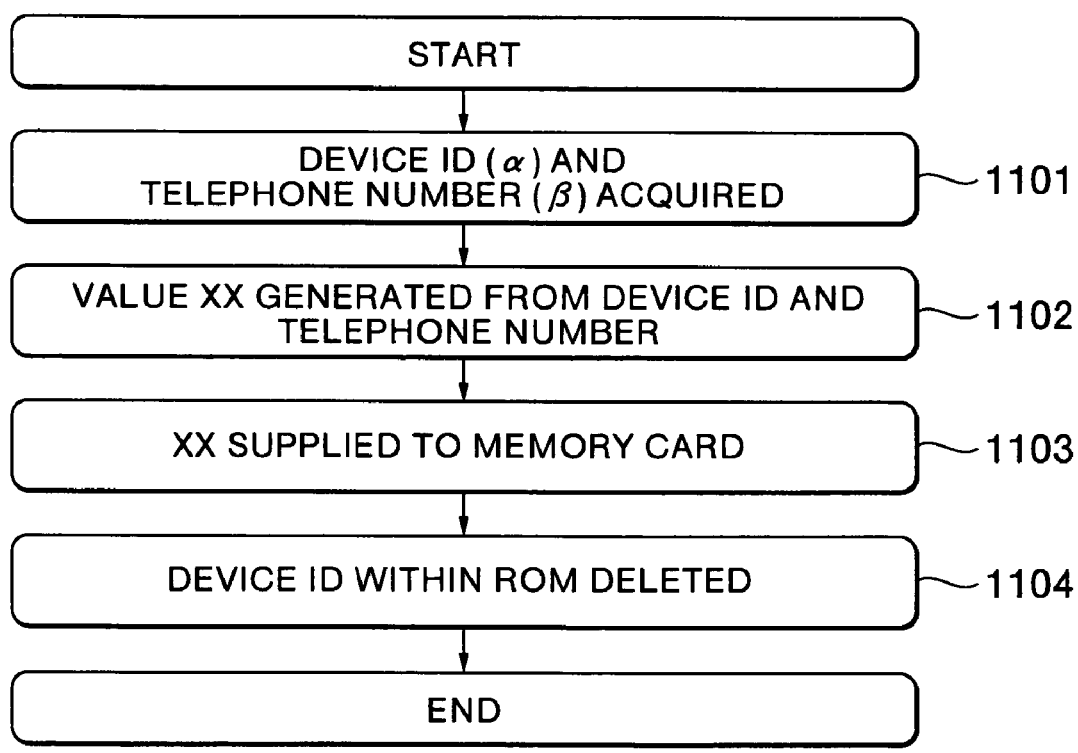
FIG. 13 is a flowchart showing one example of algorithm used when a device ID in a ROM is enciphered and the enciphered device ID is stored into a memory card in the third preferred embodiment of the invention.

FIG. 13 is a flowchart showing one example of algorithm used when the ciphering program 1005 enciphers the device ID 1004 in the ROM 1002 and stores the enciphered device ID into the memory card 1007. The ciphering program 1005 acquires a device ID ($\alpha$) and a telephone number ($\beta$) from the ROM 1002 (Step 1101), a value XX resulting from enciphering of the device ID ($\alpha$) with a ciphering key generated from the telephone number ($\beta$) (Step 1102), supplies the value XX generated at Step 1102 to the memory card (Step 1103), and deletes the device ID 1104 within the ROM 1002 (Step 1104). Incidentally, any other method can be used for generating XX at Step 1102 if only the device ID ($\alpha$) can be uniquely determined from XX, such as a conversion method by which the XOR of the device ID ($\alpha$) and the telephone number ($\beta$) is computed. It is also acceptable not to delete the device ID 1104 within the ROM 1002 at Step 1104, but a random number generated by the ciphering program 1005 may be written over the device ID 1104 instead.

Figure 14:
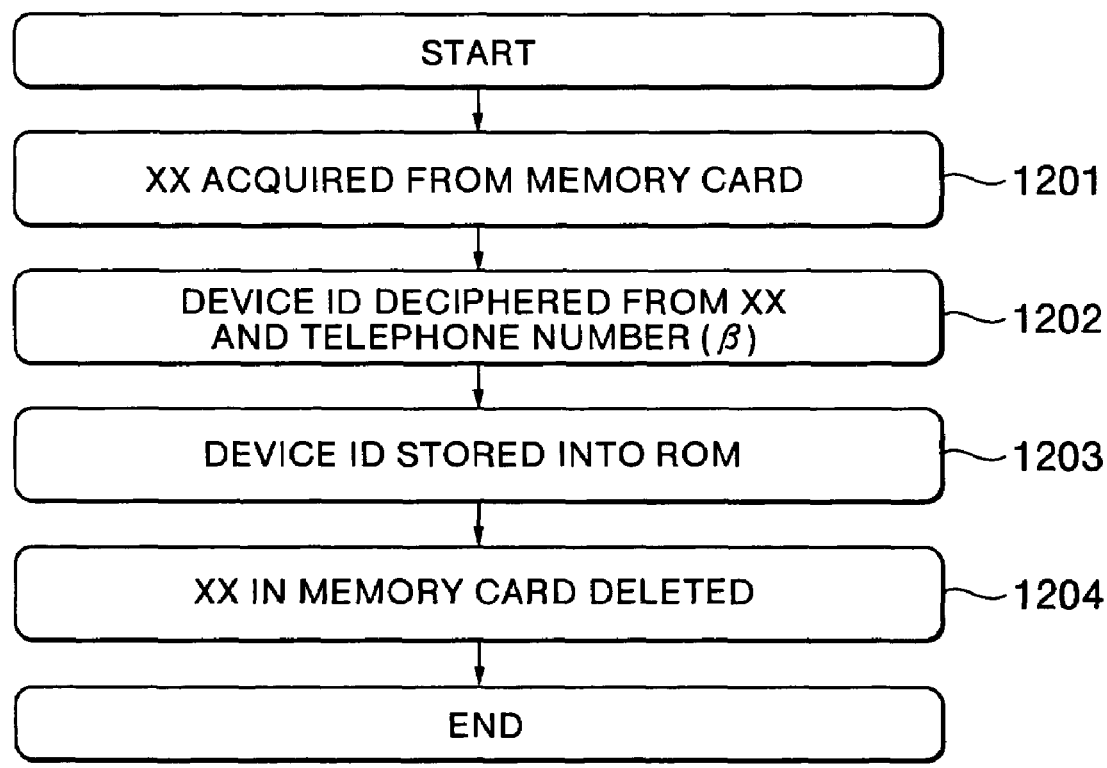
FIG. 14 is a flowchart showing one example of algorithm used when the enciphered device ID is deciphered and the deciphered device ID is written over the device ID in the ROM in the third preferred embodiment of the invention.

FIG. 14 is a flowchart showing one example of algorithm used when the ciphering program 1013 deciphers the enciphered device ID 1008 and writes the deciphered device ID over the device ID 1012 in the ROM 1010. The ciphering program 1013 reads the enciphered device ID 1008 (XX) out of the memory card 1007 (Step 1201), deciphers XX into a device ID by use of the terminal telephone number 1011 (Step 1202), writes the device ID deciphered at Step 1202 over the device ID 1012 in the ROM 1010 (Step 1203), and deletes the enciphered device ID 1008 within the memory card 1007 (Step 1204). Incidentally, Step 1202 should be an inverse conversion to the conversion formula at Step 1102. It is also acceptable not to delete the enciphered device ID 1008 within the memory card 1007 at Step 1204, but a random number generated by the ciphering program 1013 may be written over the enciphered device ID 1008 instead.

This embodiment of the invention enables the device ID of a mobile telephone to another mobile telephone without having to use a type changing jig.

Incidentally, while enciphering of contents is accomplished by the ciphering program in this embodiment of the invention, a circuit performing similar processing to the ciphering program can as well be used.

Where the terminal telephone number and the device ID are stored in a storage unit detachable from the mobile telephone, such as an SIM card or a UIM card, a user having an SIM card or a UIM card can decipher the contents of the memory card at any of a plurality of terminals.

Incidentally, where the memory card has a specific memory area having a mechanism for authentication with devices and accessible only by a device having successfully passed the authentication, by storing the enciphered title keys in the specific memory area, a personal computer or the like unable to pass authentication with the memory card can be prevented from acquiring the enciphered title keys, and the level of copyright protection can be further enhanced.

Embodiment 4

A fourth preferred embodiment of the present invention will be described below with reference to drawings.

Figure 15:
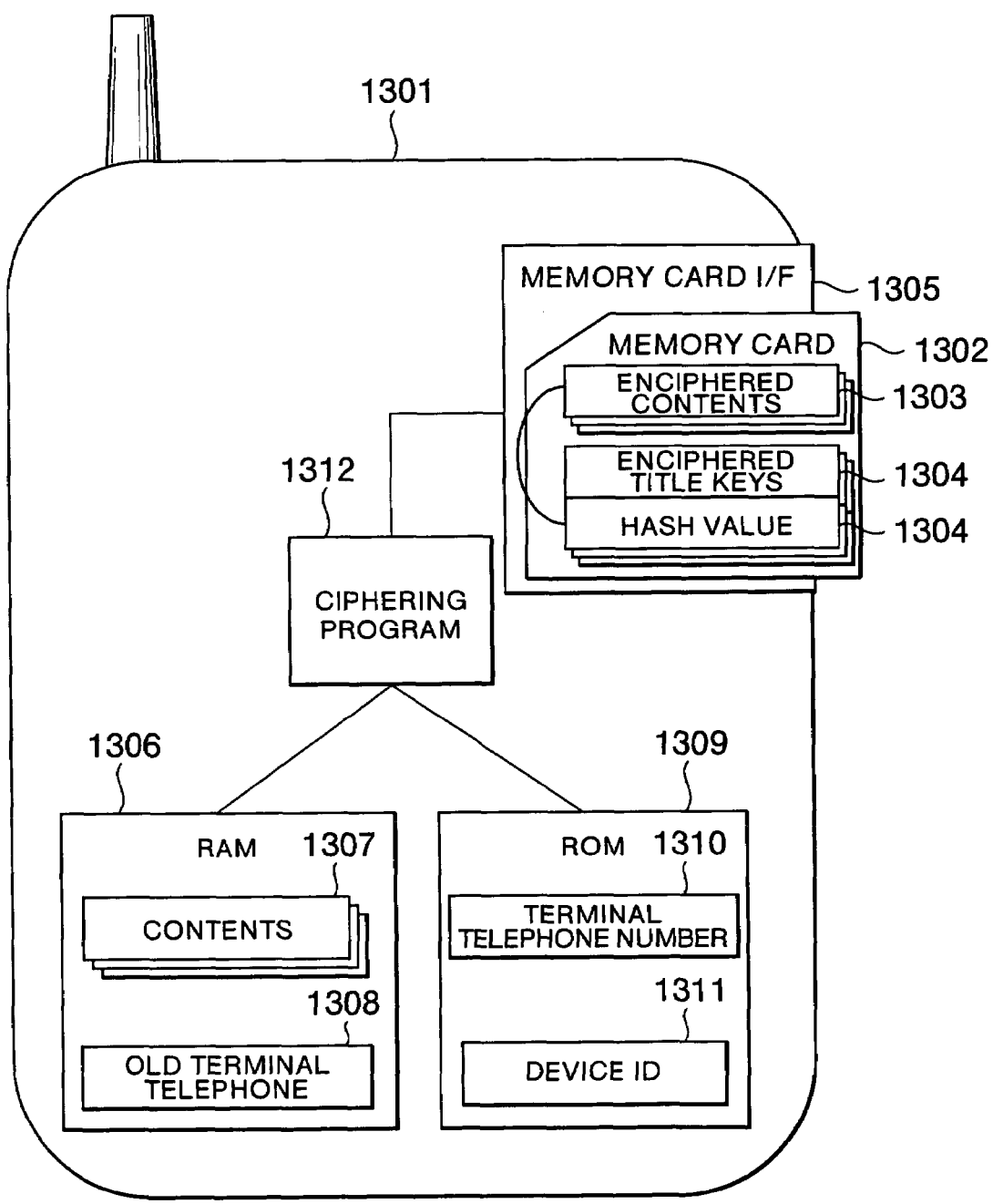
FIG. 15 is a block diagram of the internal configuration of a mobile telephone, which is a fourth preferred embodiment of the invention.

FIG. 15 is a block diagram of the internal configuration of a mobile telephone 101 in this embodiment of the invention. In FIG. 15, reference numeral 1301 denotes a mobile telephone; 1302, a memory card; 1303, enciphered contents stored in the memory card; 1304, an enciphered title key resulting from enciphering of the title key used in enciphering the contents 1303; 1305, a memory card I/F serving as the interface inputting and outputting between the memory card 1302 and the mobile telephone 1301; 1306, a RAM; 1307, contents stored in the RAM 1306; 1308, the old terminal telephone number stored in the RAM when the telephone number was changed; 1309, a ROM; 1310, a terminal telephone number stored within the ROM; 1311, a device ID intrinsic to the mobile telephone 1301; 1312, a ciphering program which deciphers the enciphered contents 1303 within the memory card 1302, enciphers the contents 1307 stored in the RAM 1306 and stores the enciphered contents into the memory card 1302, and further re-enciphers the enciphered contents 1303 within the memory card 1302 by use of the current terminal telephone number 1310; and 1313, a hash value for checking whether or not the enciphered contents have been normally deciphered. Incidentally, the old terminal telephone number 1308 corresponds to a hysteresis ID storage unit.

Figure 16:
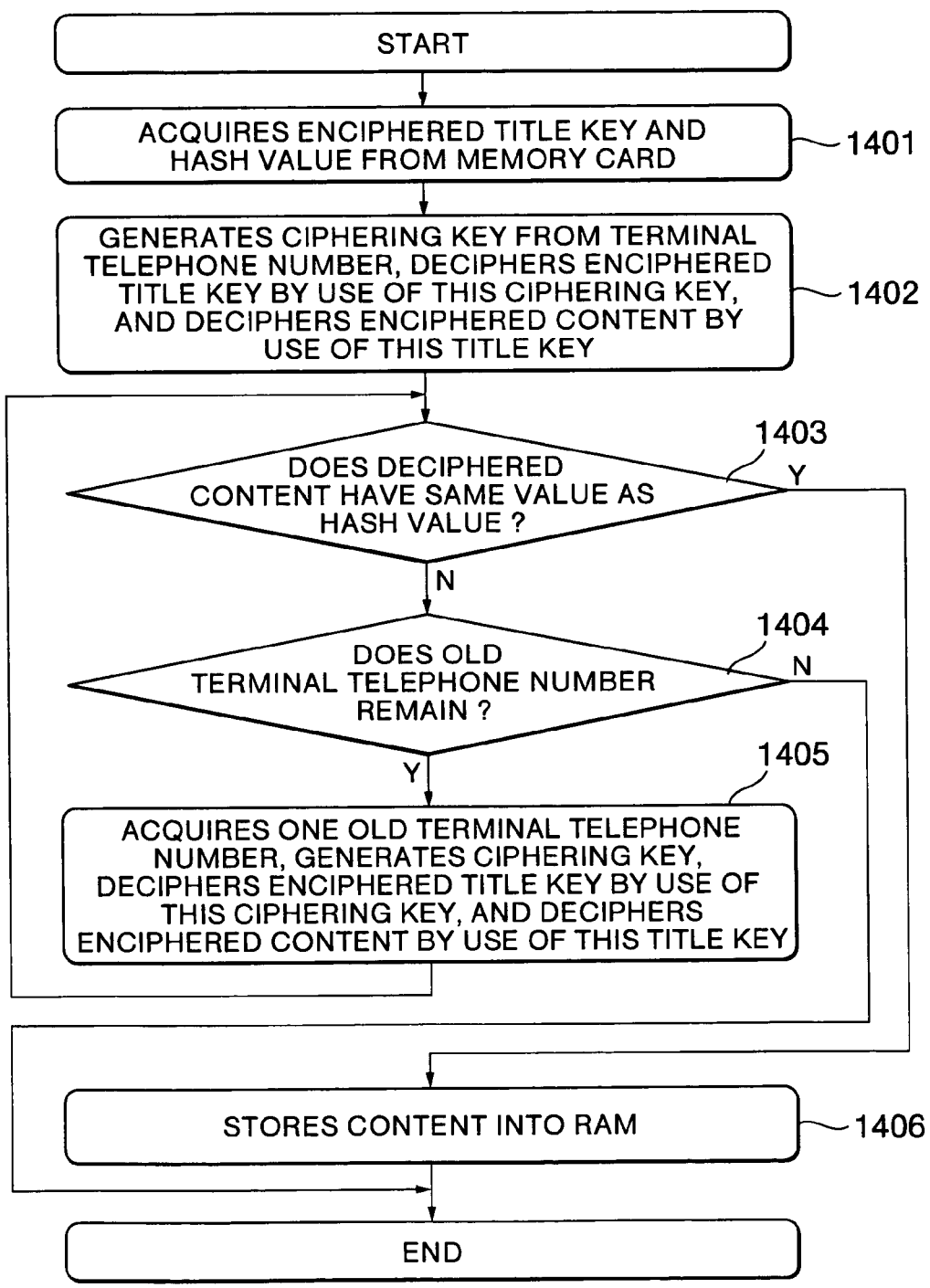
FIG. 16 is a flowchart showing one example of algorithm used when enciphered contents are deciphered and the deciphered contents are stored into a RAM in the fourth preferred embodiment of the invention.

FIG. 16 is a flowchart showing one example of algorithm used when the ciphering program 1312 deciphers the enciphered content 1303 within the memory card 1302 and stores the deciphered contents into the RAM 1306. In this algorithm, the ciphering program 1312 acquires from the memory card 1302 the enciphered title key 1304 and the hash value 1313 corresponding to the enciphered content 1303 to be deciphered (Step 1401), generates a ciphering key from the terminal telephone number 1310 within the ROM 1309, deciphers the enciphered title key 1304 acquired at Step 1401 by use of this ciphering key, and deciphers the enciphered contents 1303 by use of this deciphered title key (Step 1402). Then it computes the hash value of the content deciphered at Step 1402, compares it with the hash value 1313 acquired at Step 1401 (Step 1403), stores the content into the RAM 1306 if the comparison reveals the two values to be the same (Step 1406) and completes the processing because the deciphering has been successful.

On the other hand, if the two hash values are not found the same by comparison at Step 1403, it is checked whether or not the old terminal telephone number 1308 still remains within the RAM 1306 (Step 1404) and, if not, the processing is ended because the deciphering attempt has failed. Or if the old terminal telephone number 1308 is found remaining by comparison at Step 1404, a ciphering key is generated from this old terminal telephone number 1308, the enciphered title keys 1304 acquired at Step 1401 are deciphered by use of this ciphering key, deciphers the enciphered content 1303 by use of this deciphered title key (Step 1405), and shifts to Step 1402 again.

By the deciphering procedure described above, contents deciphered by use of the telephone number before it was changed can be deciphered with no problem.

While in the deciphering procedure described above an enciphered content 1303 is deciphered and the deciphered content is stored into the RAM 1306, if the hash value of the deciphered content is computed, the deciphered content is enciphered with a title key, this title key is further enciphered with a ciphering key generated from the terminal telephone number 1310 within the ROM 1309, and the enciphered contents 1303, the enciphered title keys 1304 and the hash value 1313 within the memory card 1302 are replaced with these enciphered content, enciphered title key and hash value, when this deciphering procedure is to be carried out again, deciphering can be accomplished more quickly because the procedure then need go through Step 1405.

Incidentally, while enciphering of contents is accomplished by the ciphering program in this embodiment of the invention, a circuit performing similar processing to the ciphering program can as well be used.

Where the terminal telephone number and the device ID are stored in a storage unit detachable from the mobile telephone, such as an SIM card or a UIM card, a user having an SIM card or a UIM card can decipher the contents of the memory card at any of a plurality of terminals.

Incidentally, where the memory card has a specific memory area having a mechanism for authentication with devices and accessible only by a device having successfully passed the authentication, by storing the enciphered title keys in the specific memory area a personal computer or the like unable to pass authentication with the memory card can be prevented from acquiring the enciphered title keys, and the level of copyright protection can be further enhanced.

As hitherto described, the present invention has an advantage that, by storing the content into the recording medium after enciphering the content by use of the ciphering key generated from the ID intrinsic to the device when a content is to be stored into the recording medium, it is made possible for the content to be read out only by the device used for storing.

Furthermore, when the device ID is to be changed on such an occasion as the telephone number change of a mobile telephone, by providing a formula of enciphering/deciphering with the previous device ID, it is made possible for the contents to be read out even after the device ID has been changed.

Furthermore, when the device ID is to be transferred to another terminal as is the case with a type change of a mobile telephone, by providing a formula for safe transfer of the device ID, another terminal can be enabled to read out the stored contents.

Although the invention has been described with reference to preferred embodiments thereof illustrated in the accompanying drawings, it is evident that persons skilled in the art can readily make various without deviating from the spirit and scope of the invention, which obviously include such modifications and alterations as well.

What is claimed is:

1. A contents processing device for outputting enciphered contents to a recording medium comprising:
   a contents storage unit for storing contents;
   a first ID storage unit for storing a first ID being intrinsic to said contents processing device and being capable of uniquely identifying said contents processing device;
   a second ID storage unit for storing a second ID being intrinsic to said contents processing device and being capable of uniquely identifying said contents processing device and being different from the first ID;

a ciphering unit which, when said first ID is stored in said first ID storage unit, obtains said first ID from said first ID storage unit, enciphers contents within said contents storage unit by use of a title key separately generated, and enciphers said title key by use of a first ciphering key generated from said first ID, and when said first ID is not stored in said first ID storage unit, obtains said second ID from said second ID storage unit, enciphers contents within said contents storage unit by use of a title key separately generated, and enciphers said title key by use of a second ciphering key generated from said second ID;

an output unit for outputting the enciphered contents and enciphered title keys toward said recording medium.

2. The contents processing device according to claim 1, wherein said contents processing device is a mobile telephone and said first ID and second ID are a telephone number of the mobile telephone.

3. The contents processing device according to claim 1, wherein said second ID can be rewritten in the second ID storage unit.

4. The content processing device according to claim 1, wherein said second ID storage unit is detachable.

5. The contents processing device according to claim 1, wherein said recording medium has a specific memory area for storing data relating to the ciphered contents, and the contents processing device comprises an authentication means for judging whether or not access to the specific memory area of the recording media is permitted.

6. A contents processing device for inputting contents from a recording medium comprising:

an input unit for obtaining ciphered contents and ciphered title key from said recording medium;

a first ID storage unit for storing a first ID being capable of uniquely identifying said contents processing device;

a second ID storage unit for storing a second ID being capable of uniquely identifying said contents processing device and being different from the first ID;

a deciphering unit which, when said first ID is stored in said first ID storage unit, deciphers the title key ciphered by use of a first ciphering key generated from said first ID, and further deciphers the ciphered contents by use of the deciphered title key; and when said first ID is not stored in said first ID storage unit, deciphers the title key ciphered by use of a second ciphering key generated from said second ID stored in the second ID storage unit; and a contents storage unit for storing the deciphered contents.

7. The contents processing device according to claim 6, wherein said contents processing device is a mobile telephone and said first ID and second ID are a telephone number of the mobile telephone.

8. The contents processing device according to claim 6, wherein said second ID storage unit is detachable.

9. The contents processing device according to claim 6, wherein said recording medium stores the ciphered contents and a hash value, and said input unit obtains said hash value, and checks whether or not the ciphered contents have been correctly deciphered by comparing the obtained hash value with the hash value of the deciphered contents.

10. The contents processing device according to claim 9, wherein said first ID storage unit stores more than one first ID.

11. The contents processing device according to claim 6, wherein said recording medium has a specific memory area for storing data relating to the ciphered contents, and the contents processing device comprises an authentication means for judging whether or not access to the specific memory area of the recording media is permitted.

* * * * *

UNITED STATES PATENT AND TRADEMARK OFFICE
CERTIFICATE OF CORRECTION

PATENT NO.        : 7,487,547 B2
APPLICATION NO.   : 10/491963
DATED             : February 3, 2009
INVENTOR(S)       : Shinichi Nakai It is certified that error appears in the above-identified patent and that said Letters Patent is hereby corrected as shown below:

On the title page, item:
(75) Inventors, delete "Taihei Yagawa" and insert --Taihei Yugawa--.

Signed and Sealed this

Eighteenth Day of May, 2010

David J. Kappos
*Director of the United States Patent and Trademark Office*